(12) United States Patent
Cheatham (10) Patent No.: US 8,733,141 B2
(45) Date of Patent: May 27, 2014

(54) SECURITY DEVICES FOR WHEELS (76) Inventor: James F. Cheatham, Palos Verdes Estates, CA (US)

( * ) Notice: Subject to any disclaimer, the term of this patent is extended or adjusted under 35 U.S.C. 154(b) by 0 days.

(21) Appl. No.: 12/587,640

(22) Filed: Oct. 8, 2009

(65) Prior Publication Data

US 2011/0083481 A1    Apr. 14, 2011

(51) Int. Cl.
*B60R 25/00* (2013.01)

(52) U.S. Cl.
USPC .................................. 70/226; 70/19; 70/209

(58) Field of Classification Search
USPC ......... 70/14, 18, 19, 209, 225, 226, 237, 259, 70/260
See application file for complete search history.

(56) References Cited

U.S. PATENT DOCUMENTS

| | | | | |
|---|---|---|---|---|
| 4,833,442 A * | 5/1989 | Von Heck | ....................... | 70/226 |
| 5,134,868 A * | 8/1992 | Bethards | ....................... | 70/226 |
| 5,137,121 A * | 8/1992 | Leonard | ....................... | 70/226 |
| 5,247,815 A * | 9/1993 | Caldwell | ....................... | 70/226 |
| 5,873,275 A * | 2/1999 | Lukich | ....................... | 70/226 |
| 5,887,462 A * | 3/1999 | Stone | ....................... | 70/226 |
| 6,434,980 B1 * | 8/2002 | Foster | ....................... | 70/237 |
| 7,032,416 B1 * | 4/2006 | Wu | ....................... | 70/226 |
| 7,107,802 B2 * | 9/2006 | Clarke | ....................... | 70/226 |
| 7,194,878 B2 * | 3/2007 | Johnson et al. | ....................... | 70/226 |
| 7,594,415 B1 * | 9/2009 | Wu | ....................... | 70/226 |

* cited by examiner

*Primary Examiner* — Christopher Boswell (57) ABSTRACT

A security device attaches to and secures a wheel of vehicle. The security device has a pair of arms for releasably engaging with a wheel and a locking assembly attached to or disposed between the arms. The locking assembly may include a static portion disposed on one of the arms and an actuatable portion disposed on the other arm. The actuatable portion is receivable within the static portion. The static portion may include one or more rack plates each having a plurality of tabs, with the rack plates being disposed in an opposite and spaced relationship, such that the actuatable portion is receivable therebetween. The actuatable portion may include a rotatable cam having a pair of oppositely disposed arms. The actuatable portion is positionable in a secured position in which the arms are respectively engaged with tabs of the rack plates, and an opened position in which the arms are disengaged from the rack plates.

20 Claims, 9 Drawing Sheets

SECURITY DEVICES FOR WHEELS

BACKGROUND

The present invention relates to security devices for vehicles and trailers, and more specifically to a wheel lock security device.

Wheel locks are used on vehicles, trailers, and other wheeled devices to deter or prevent theft. Typically, wheel locks have a pair of arms that are positioned on each side of a wheel, and a locking mechanism that locks the arms together in place on the wheel. Accordingly, if the vehicle is moved, the wheel lock rotates with the wheel, thereby impeding motion for any reasonable distance at a reasonable speed.

In addition to personal vehicles, wheel locks may be used to secure trailers (e.g., for boats, motorcycles, etc.), construction trailers, traffic-control trailers, motorcycles, farm equipment, construction equipment, and so on.

There is a continued need in the art for improved wheel locks with enhanced security, usability, versatility, and robustness.

SUMMARY

A security device attaches to and secures a wheel of vehicle. According to one aspect, the security device has a pair of arms for releasably engaging with a wheel and a locking assembly attached to or disposed between the arms. The locking assembly may include a static portion disposed on one of the arms and an actuatable portion disposed on the other arm. The actuatable portion is receivable within the static portion. The static portion may include one or more rack plates each having a plurality of tabs, with the rack plates being disposed in an opposite and spaced relationship, such that the actuatable portion is receivable therebetween. The actuatable portion may include a rotatable cam having a pair of oppositely disposed arms.

The actuatable portion is positionable in a secured position in which the arms are respectively engaged with tabs of the rack plates, and an opened position in which the arms are disengaged from the rack plates. According to another aspect, the locking assembly is configured such that the actuatable portion is slidable or telescopically receivable within the static portion when in the opened position and secured by or within the static portion when in the secured position.

According to still other aspects, the security device may include a chock for use in preventing inadvertent rolling of a wheel and vehicle. The security device may also include a safety assembly to prevent inadvertent separation of the arms, thereby preventing injury during installation or handling. The security device may also include electronic security circuitry with a motion sensor to provide either a local signal of a remote signal that the security device is being tampered with.

Other features and advantages of the present invention will become apparent to those skilled in the art from a consideration of the following detailed description taken in conjunction with the accompanying drawings.

DETAILED DESCRIPTION

Figure 1:
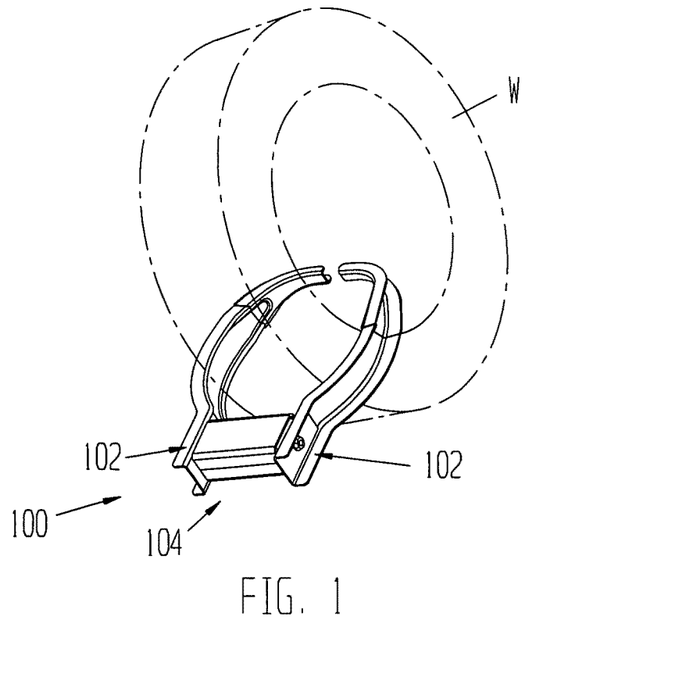
FIG. 1 is a perspective view of a security device installed on a wheel of a vehicle.
Figure 2:
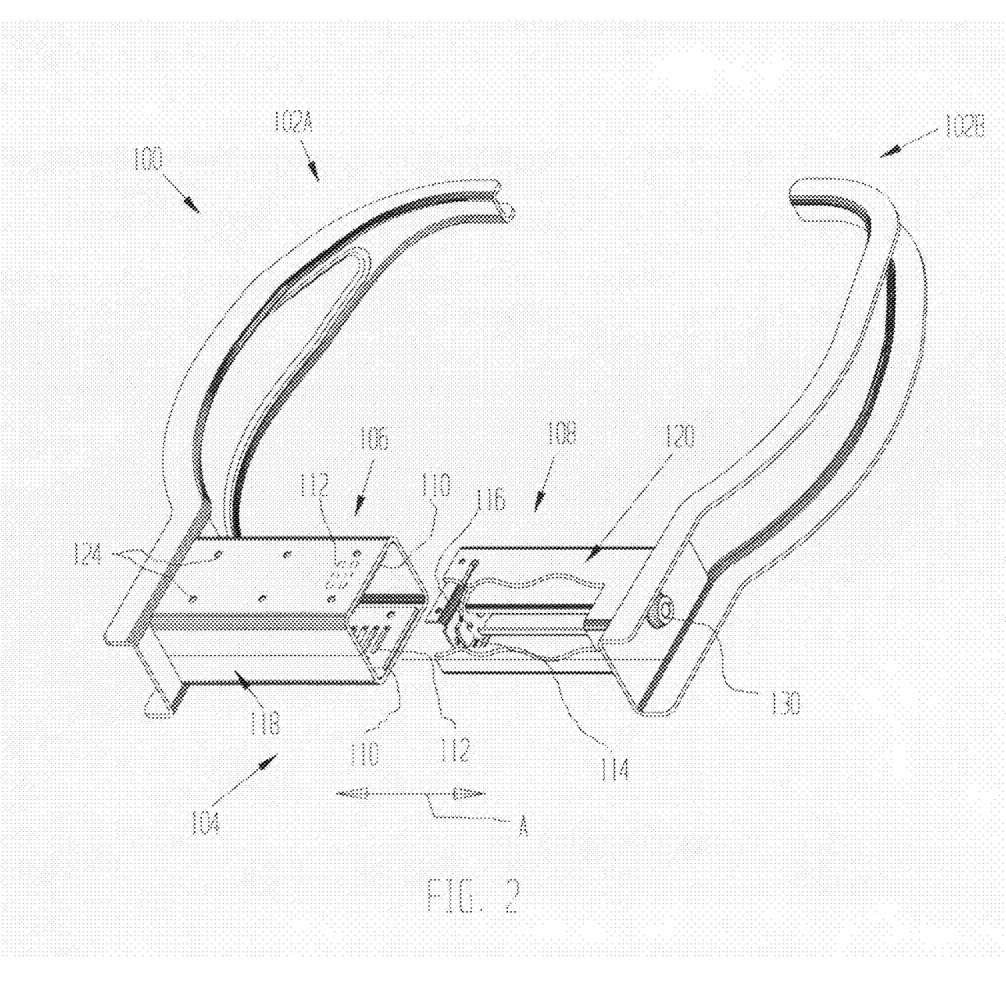
FIG. 2 is a cut-away perspective view of a security device shown in an opened position.
Figure 3:
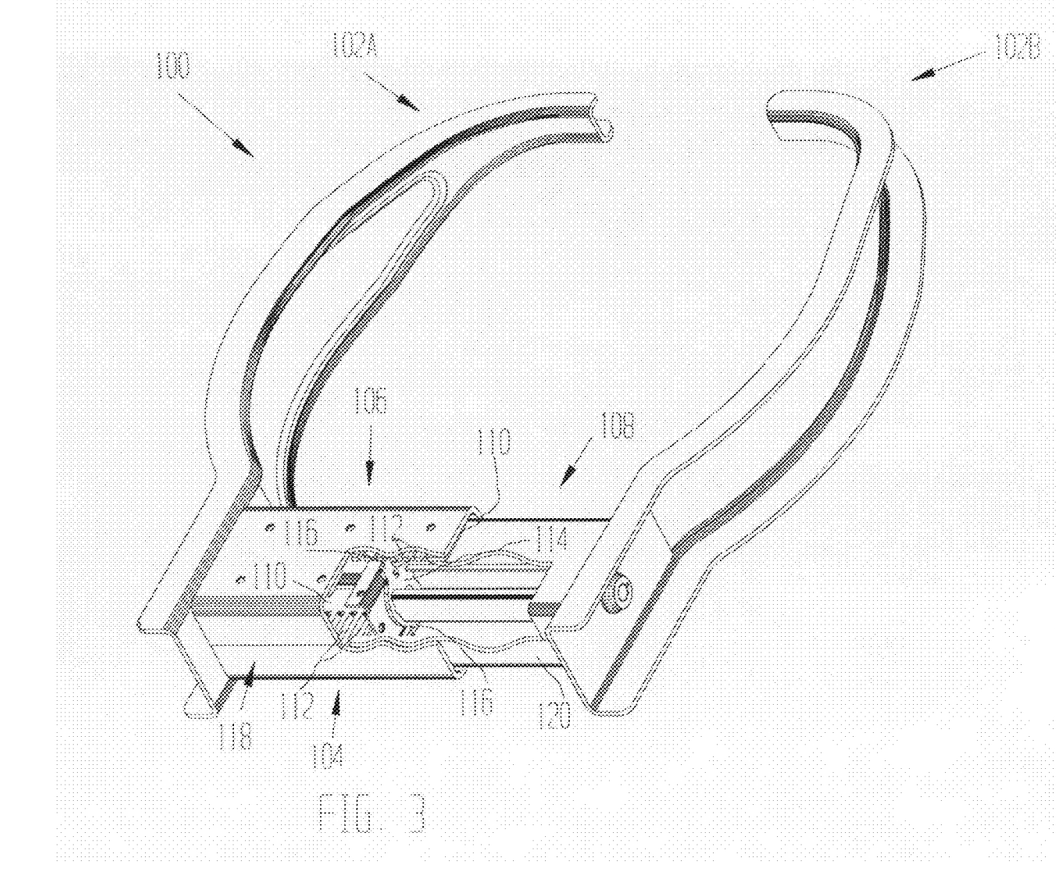
FIG. 3 is a cut-away perspective view of a security device shown in a secured position.

Referring particularly to FIGS. 1, 2, and 3 of the drawings, a device 100 such as a wheel lock attaches to and secures a wheel W of vehicle. In a number of embodiments, the device 100 includes a pair of arms 102a and 102b for releasably engaging with a wheel W, and a locking assembly 104 attached to or disposed between the arms 102.

According to a number of embodiments, the locking assembly 104 may include a static portion 106 disposed on one of the arms 102a and an actuatable portion 108 disposed on the other arm 102b, with the actuatable portion 108 being configured to be receivable within the static portion 106. In many embodiments, the static portion 106 may include one or more rack plates 110 each having a plurality of tabs 112, and the rack plates 110 may be disposed in an opposite and spaced relationship, such that the actuatable portion 108 is receivable therebetween.

Figure 4:
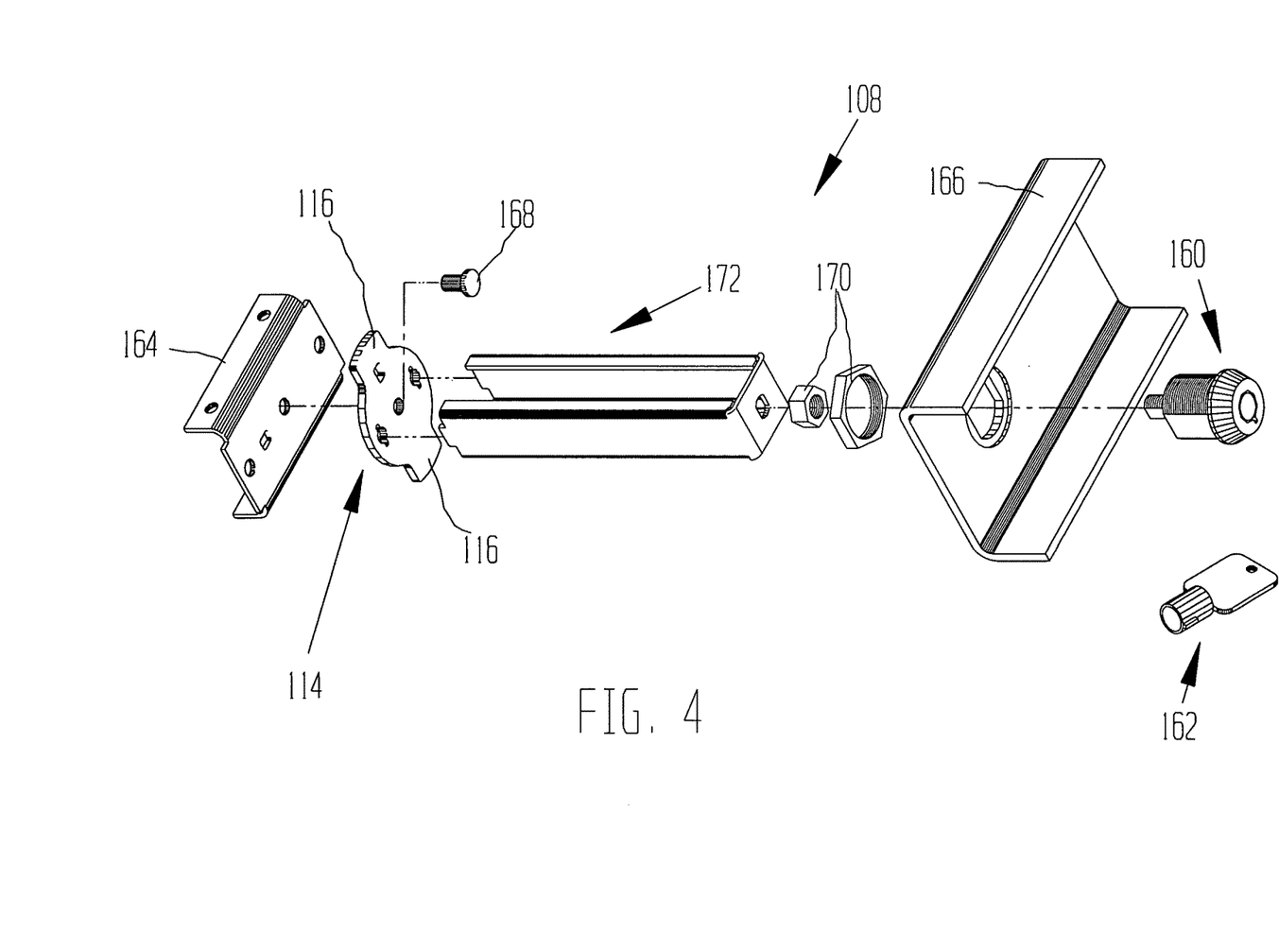
FIG. 4 is an exploded view of an actuatable portion of a locking assembly for a security device.

With additional reference to FIG. 4, the actuatable portion 108 may include a rotatable cam 114 having a pair of oppositely disposed arms 116. In a number of embodiments, the actuatable portion 108 may be described has being positionable in (1) a secured position, such as shown in FIG. 3, in which the arms 116 are respectively engaged with tabs 112 of the rack plates 110, and (2) an opened position, such as shown in FIG. 2, in which the arms 116 are disengaged from the rack plates 110. Accordingly, the locking assembly 104 may be described as being configured such that the actuatable portion 108 is (1) slidable or telescopically receivable within the static portion 106 when in the opened position as shown by arrow A in FIG. 2, and (2) secured by or within the static portion 106 when in the secured position as shown in FIG. 3.

Figure 4A:
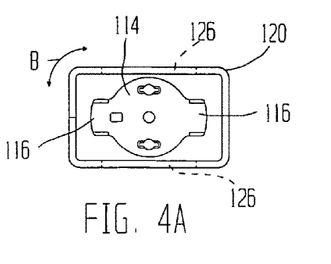
FIG. 4A is an end side view illustrating a cam within a housing of an actuatable portion of a locking assembly for a security device shown in an opened position.
Figure 4B:
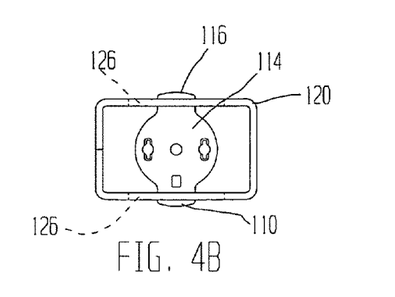
FIG. 4B is an end side view illustrating a cam within a housing of an actuatable portion of a locking assembly for a security device shown in an secured position.

In still other embodiments, the locking assembly 104 may be described as including the static portion 106 having a housing 118 and the actuatable portion 108 having a housing 120, with the actuatable portion 108 being receivable within the static portion 106. (For the purposes of this description, housing 118 of the static portion 106 may be described as the outer housing 118, and housing 120 of the actuatable portion 108 may be described as the inner housing 120.) With the cam 114 received within the inner housing 120, the locking assembly 104 may be described as being configured such that the actuatable portion 108 is positionable in an opened position in which the cam 114 is received within the inner housing 120 as shown in FIGS. 2 and 4A, and a secured position in which the cam 114 projects beyond the inner housing 120 and is engageable with the static portion 106 as shown in FIGS. 3 and 4B.

Figure 5:
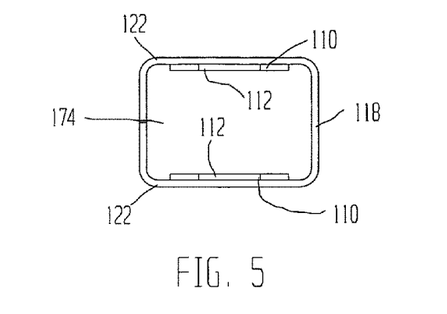
FIG. 5 is an end side view illustrating rack plates disposed in a housing of a passive portion of a locking assembly for a security device.

In still other embodiments such as shown in FIG. 5, the housing 118 of the static portion 106 may include a pair of oppositely disposed walls 122. The rack plates 110 may then be respectively disposed on the walls 122 in a space relationship. The embodiment of the outer housing 118 shown in FIG. 5 may be described such that the rack plates 110 are disposed on or fixed to the walls 122 in a substantially planar, flush, and abutting relationship. Accordingly, the tabs 112 are positioned near or at an inner surface of the walls 122. In some of the embodiments, the rack plates 110 may be fixed to the outer housing 122 with half shears 124 (see FIG. 2) to enhance the strength of the locking mechanism 104. Depending on the particular embodiment, the rack plates 110 may be fixed to the outer housing 122 in any known manner, including welding.

Figure 6:
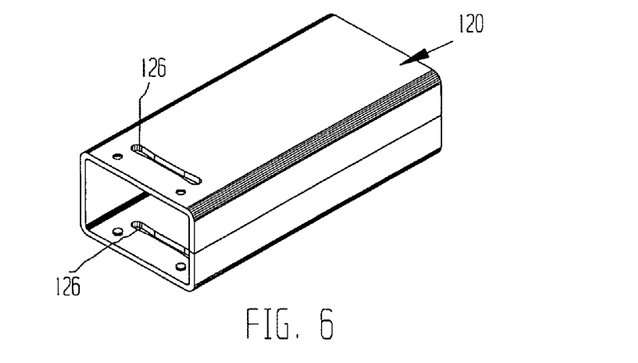
FIG. 6 is a perspective view of a housing for an actuatable portion of a locking assembly for a security device.

According to the embodiments shown in FIGS. 4 and 6, the housing 120 of the actuatable portion 106 may include apertures 126 through which the arms 116 respectively project when in the secured position. Accordingly, when the inner housing 120 is received between the rack plates 110 as shown in FIG. 3, the arms 116 are able to project through the apertures 126 to be received in a corresponding pair of tabs 112 of the rack plates 110.

As mentioned above, the inner housing 120 may be telescopically engageable with the outer housing 118. According to a number of embodiments, the housings 118 and 120 may be configured to minimize or substantially eliminate the possibility of external torque forces being applied to or from acting upon the locking assembly 104. More specifically, when the arms 102 are engaged with a wheel W as shown in FIG. 1, if the vehicle is inadvertently moved, force may be applied to the securing device 100. In conventional wheel locks with handles, the handle acts as a lever arm, applying torque to the locking mechanisms, thereby damaging the wheel lock by bending or twisting internal devices. The damaged devices are very difficult to subsequently remove. Accordingly, in the embodiments shown in the figures, the housings 118 and 120 are free of external handles that may cause such torquing. However, embodiments of the securing device 100 may include handles as known in the art if desired.

Figure 7:
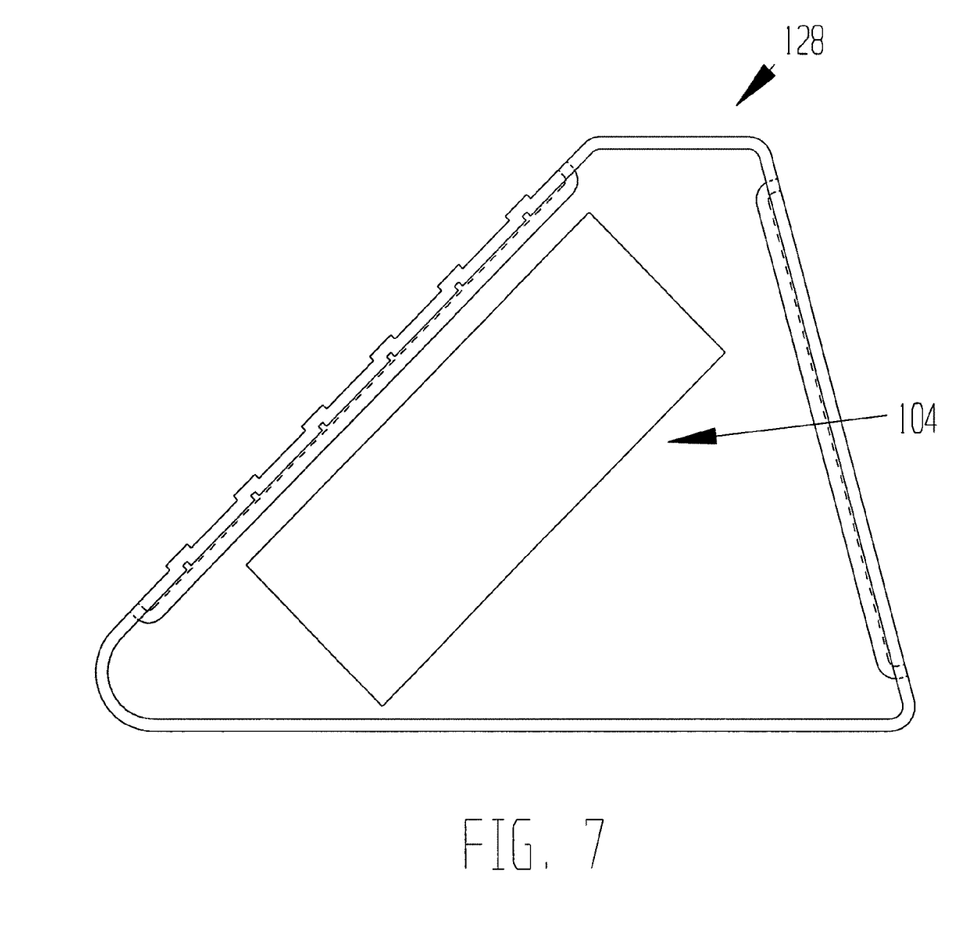
FIG. 7 is an end side view illustrating a chock received about a locking assembly.
Figure 8:
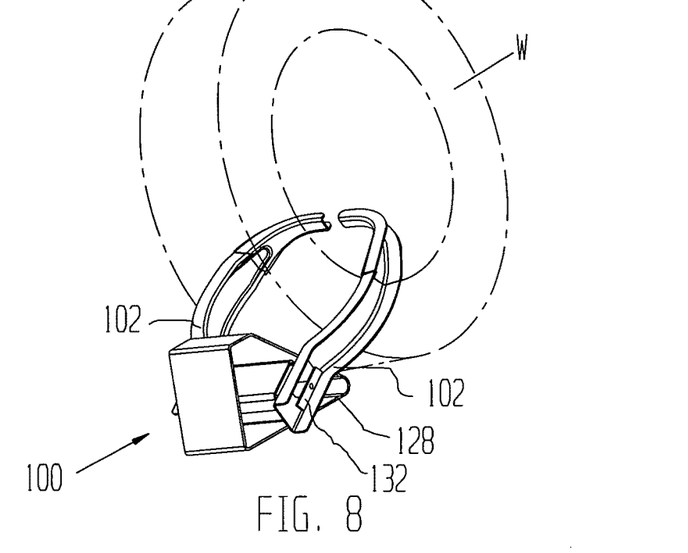
FIG. 8 is a perspective view of a security device with a chock installed on a wheel of a vehicle.

In still other embodiments such as shown in FIG. 7, the securing device 100 may include a chock 128 that is receivable about the locking assembly 104. Accordingly, when received on a wheel, the chock 128 prevents inadvertent rolling of the wheel. In these embodiments, rather than having a keyed lock 130 as shown in FIG. 2 for actuating the cam 114, the locking mechanism 104 may include a handle 132 to actuate the cam 114. Accordingly, for the purposes of this description and depending upon the particular embodiment, the locking mechanism 104 may be configured as a security device with a keyed lock (discussed below) to prevent theft or as a retaining device to hold the arms 102 and the chock 128 in place on a wheel W.

Figure 9:
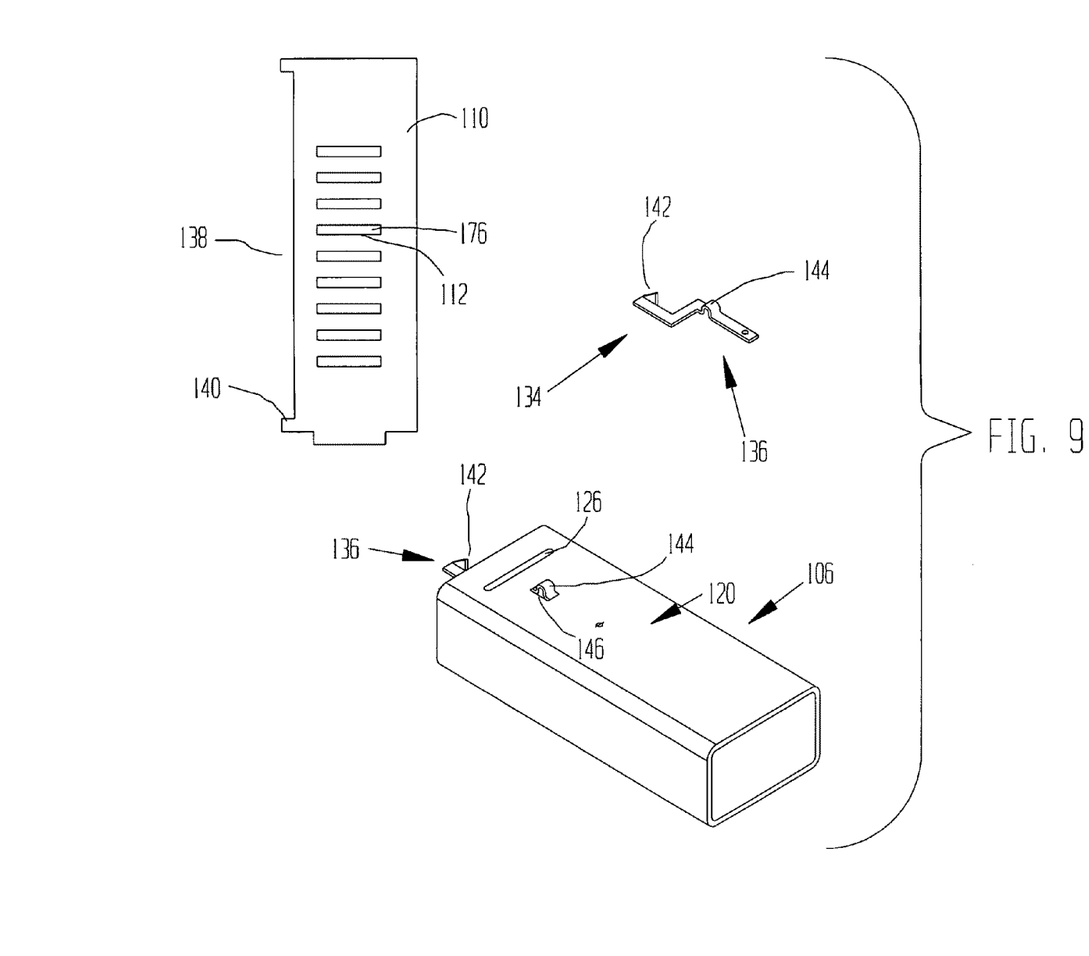
FIG. 9 illustrates a safety assembly for a security device.

In still further embodiments, the securing device 100 may include a safety assembly 134 disposed on the arms 102 or the locking mechanism 104, as shown in FIG. 9. The safety assembly 134 is configured to prevent the arms 102 from freely dislodging or disengaging from each other, which may cause injury to a person's foot during handling or installation.

In many embodiments, preventing disengagement may be accomplished by configuring the safety assembly 134 to include a latch 136 disposed inside the inner housing 120 of the actuating portion 106 and a slot 138 formed in the rack plate 110 of the static portion 104, thereby forming a catch 140. The latch 136 may include a tooth 136 and a button 144, and may be disposed on the inner housing 120 so as to be biased through spring force of the latch 136 to be in a position in which the tooth 142 is slidable in the slot 138 when the inner housing 120 is received within the outer housing 118 (see FIG. 3), and engages with the catch 140 when the inner housing 120 is pulled outward from the outer housing 118. To separate the inner housing 120 from the outer housing 118 (and, therefore, to separate or disengage the arms 102), the button 144 projecting through an aperture 146 of the inner housing 120 may be depressed to disengage the tooth 142 from the catch 140, thereby releasing the inner housing 120 from the outer housing 118.

Figure 10:
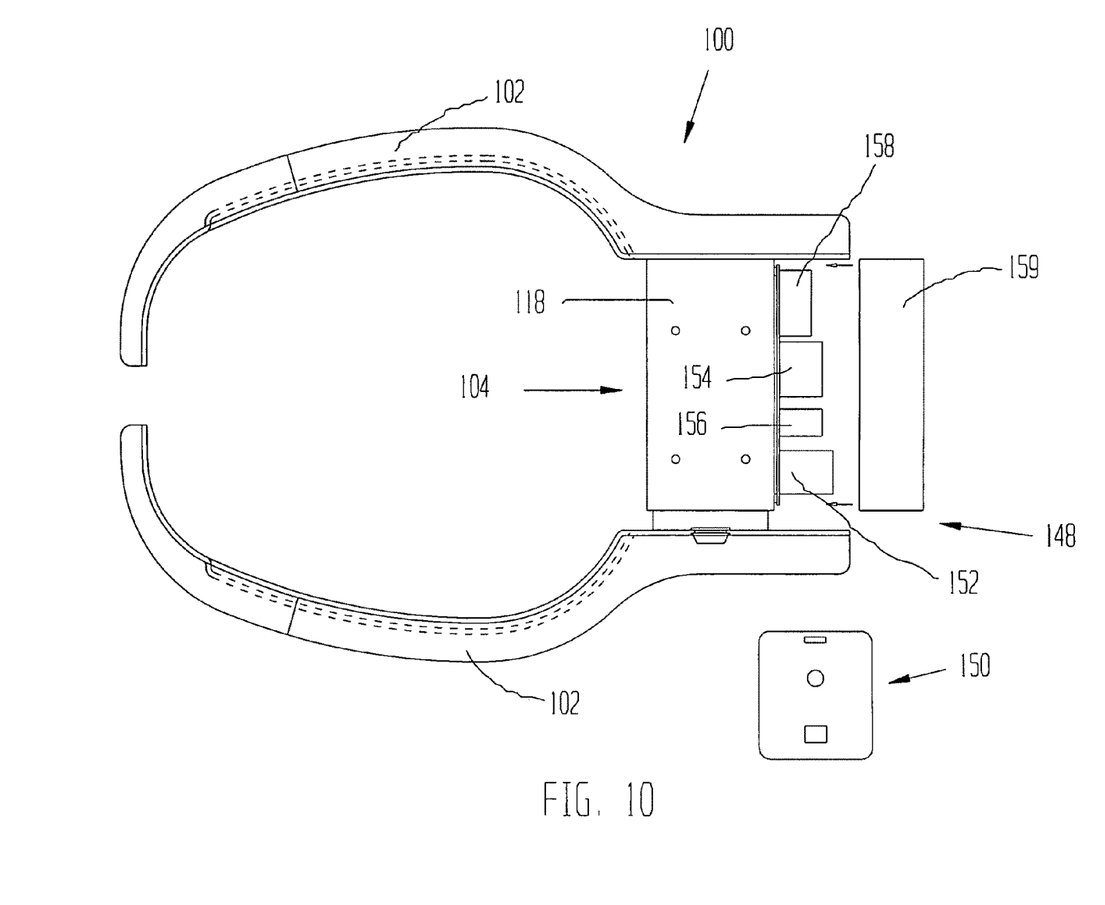
FIG. 10 illustrates a security device with electrical security circuitry.

In still further embodiments, the securing device 100 may include an electrical security circuit 148 that is configured to communicate with a remote receiver 150. The circuit 148 may include a motion sensor 152, a transmitter 154, and a power supply 156 such as a battery. The circuit 148 is configured to transmit a signal to the remote receiver 150 when the motion sensor 152 is actuated. The circuit 148 may also include a security device 158 such as a siren or a strobe to provide a local alarm in the event the motion sensor 152 is activated. A removable cover 159 may also be included. Accordingly, the security circuitry 148 may be configured to provide either or both a local signal and a remote signal when the motion sensor 152 detects that the security device 100 is being tampered with.

With additional reference to the embodiments of FIG. 4, the actuatable portion 108 may include a locking device 160 with a key 162 for actuating the cam 114 between the opened position and the secured position. The cam 114 may be rotatably connected between an inner end plate 164 and an outer end plate 166 that may be fixed to inner surfaces of the inner housing 120, for example, with a screw 168, nuts 170, and a drive shaft device 172. Accordingly, the cam 114 is rotatable within the inner housing 120 as shown by arrow B in FIG. 4A.

In a number of manufacturing embodiments, the rack plates. 110 may be attached or fixed to the inner surfaces of the opposing walls 122 of the outer housing 118 (see FIG. 5), with the outer housing 118 then attached or fixed to one of the arms 102a (see FIG. 2). The apertures 126 may then be formed in the inner housing 120, and the cam 114 may be disposed within the inner housing 120. The actuatable portion 108 of the locking assembly 104 may then be attached or fixed to the other arm 102b such that the actuatable portion 108 is receivable between the rack plates 110. By configuring and manufacturing the locking mechanism 104 according to these embodiments, the outer housing 118 defines a hollow channel 174 therewithin that is substantially free of any obstruction, as particularly shown in FIG. 5. Accordingly, the inner housing 120 is freely receivable and slidable within the inner channel 174.

In addition, to minimize any moment or lever arms during an attempted dislodging of one arm 102 from the other arm 102 when the locking mechanism 104 is in a secured position, the rack plates 110 may be disposed at or near (e.g., substantially at the plane of) the walls 122 of the outer housing 118, as shown in FIG. 5. Accordingly, any leverage provided by a distance between the tabs 112 and the outer housing 118 is minimized, resulting in a stronger secured position.

Figure 11:
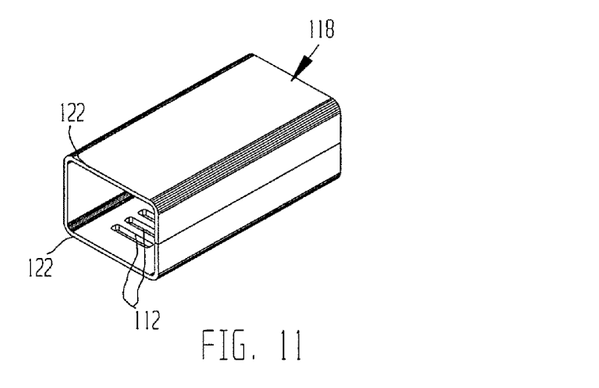
FIG. 11 is a perspective view illustrating a housing with unitary tabs for a passive portion of a locking assembly for a security device.

In some of the embodiments, the tabs 112 may be unitarily formed in the walls 122 of the outer housing 118. In this regard, reference is made to FIG. 11 which illustrates the tabs 112 formed in the walls 122 themselves, thereby eliminating the rack plates 110 altogether, as shown in FIG. 11. Accordingly, in a number of embodiments, the static portion 104 may be described as having a pair of oppositely disposed sets of linearly disposed tabs 112. The tabs 112 shown in, e.g., FIG. 9, are formed by cutting slots 176 through the rack plates 110.

Figure 12:
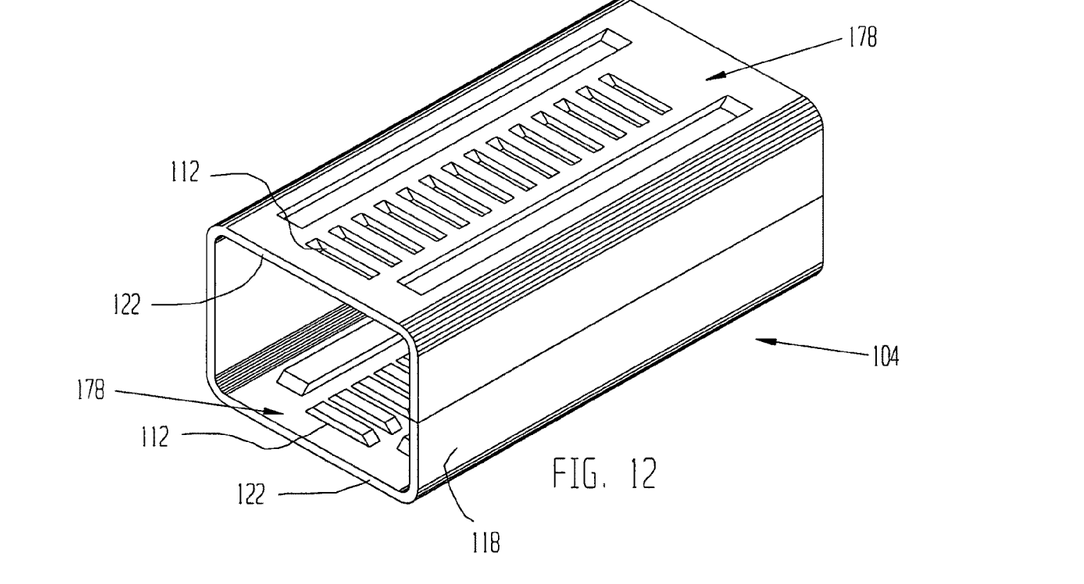
FIG. 12 is a perspective view illustrating an outer housing of a static portion with unitarily formed tabs.
Figure 13A:
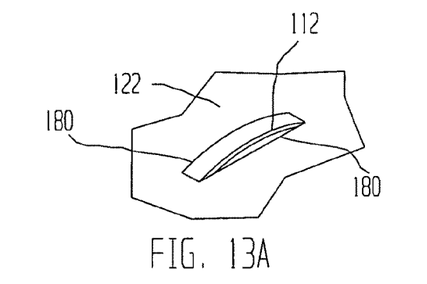
FIGS. 13A, 13B, and 13C respectively illustrate alternative embodiments of unitarily formed tabs of a static portion.
Figure 13B:
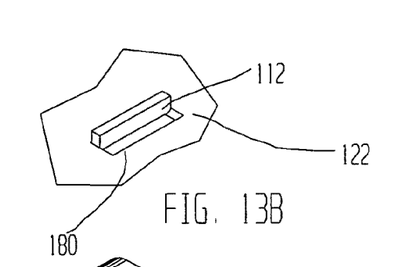
Figure 13C:
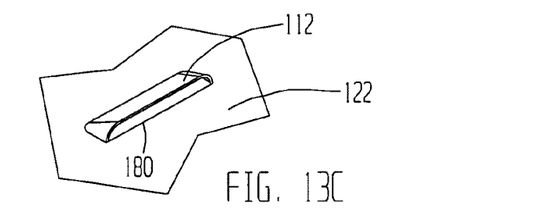

Another unitarily formed embodiment is shown in FIG. 12 in which the tabs 112 are formed by stamping or pressing the opposing walls 122 of the outer housing 118, thereby forming a pair of sets 178 of linearly disposed tabs 112. Other embodiments as shown in FIG. 13A include forming the tabs 112 by making pairs of cuts 180 in the wall, and then pressing the intermediate portion inwardly to form tabs 112. Still other embodiments as shown in 13B and 13C include forming the tabs 112 by lancing in which a partial cut 180 is made in the wall 122, with the wall then being pressed, bent, shaped, or folded to form the tabs 112.

Accordingly, in the unitarily formed embodiments, little or no material needs to be removed to form the tabs 112 from the walls 122 or the housing 118. In addition, the distance between the tab 112 and the outer housing 118 is essentially eliminated. In addition, manufacturing processes are streamline and simplified, thereby increasing production efficiencies and reducing cost.

Those skilled in the art will understand that the preceding embodiments of the present invention provide the foundation for numerous alternatives and modifications thereto. These other modifications are also within the scope of the present invention. Accordingly, the present invention is not limited to that precisely as shown and described in the present invention.

What is claimed is:

1. A device for securing a wheel, the device comprising:
   a pair of arms for engaging with a wheel; and
   a locking assembly including a static portion disposed on one of the arms and an actuatable portion disposed on the other arm and being receivable within the static portion;
   the static portion including a pair of oppositely disposed walls and a pair of oppositely disposed rack plates each having a plurality of tabs;
   the rack plates being respectively fixed to the walls such that the tabs are positioned at inner surfaces of the walls;
   the actuatable portion including a rotatable cam having a pair of oppositely disposed arms and being positionable in:
      a secured position in which the arms are respectively engaged with the rack plates; and
      an opened position in which the arms are disengaged with the rack plates;
   the locking assembly being configured such that the actuatable portion is:
      slidable within the static portion between the rack plates when in the opened position such that the actuatable portion is positioned between the rack plates when in the opened position; and
      secured within the static portion when in the secured position such that the actuatable portion is positioned between the rack plates when in the opened position.

2. The device of claim 1 wherein the rack plates are respectively fixed to the walls in a substantially parallel planar abutting relationship.

3. The device of claim 1 wherein the rack plates are fixed to the walls by half shears.

4. The device of claim 1 wherein the actuatable portion includes a housing in which the cam is received;
the housing including a pair of apertures through which the arms project when in the secured position.

5. The device of claim 4 wherein the housing of the actuatable portion is receivable between the rack plates.

6. The device of claim 1 wherein the static and actuatable portions each include a housing with the housings respectively disposed on the arms and being telescopically engageable with each other.

7. The device of claim 6 wherein the housings are configured such that when the arms are engaged with a wheel and the housings are telescopically engaged with each other, external torque forces cannot act upon the locking assembly.

8. The device of claim 1 further comprising chock disposed about the locking assembly.

9. The device of claim 1 further comprising a safety assembly disposed on the arms and configured to prevent the arms from freely dislodging from each other.

10. The device of claim 1 further comprising an electrical circuit including a motion sensor and being configured to transmit a signal when the motion sensor is actuated.

11. A method of manufacturing a device for securing a wheel, the device including a pair of arms for engaging with a wheel and a locking assembly, the method comprising:
   fixing a set of linearly disposed tabs to an inner surface a wall within an inner channel of a housing;
   attaching the housing to a first one of the arms; and
   forming an actuatable portion of the locking assembly such that the actuatable portion includes a housing with an aperture;
   attaching the actuatable portion to a second one of the arms such that the actuatable portion is receivable within the inner channel of the housing of the first arm with the aperture enabling access to the tabs;
   wherein the actuatable portion is wholly receivable within the inner channel of the housing between the set of tabs.

12. The method of claim 11 wherein the step of fixing a set comprises attaching a pair of rack plates on which the sets of tabs are formed to the inner surfaces of opposing walls of the housing.

13. The method of claim 11 wherein the step of fixing a set comprises unitarily forming the sets of tabs with the housing.

14. The method of claim 11 wherein the step of forming the actuatable portion further comprises:
   forming the aperture in the housing; and
   disposing a cam within the housing with the aperture such that cam is received within the housing in a first position and extends through the aperture of the housing when in a second position;
   wherein the step of attaching an actuatable portion includes attaching the housing of the actuatable portion to the second arm such that:
      the housing of the actuatable portion is receivable within the housing with the rack plates; and
      the cam is engageable with the rack plates when in the second position.

15. A device for securing a wheel, the device comprising:
   a pair of arms for engaging with the wheel; and
   a locking assembly including a static portion disposed on one of the arms and an actuatable portion disposed on the other arm and being receivable within the static portion;
   the actuatable portion including a housing and a cam received within the housing and being configured such that the actuatable portion is positionable in:
      an opened position in which the cam is received within the housing; and
      a secured position in which the actuatable portion is positioned within the static portion and the cam projects through the housing of the actuatable portion such that a portion of the cam is positioned on an outside of the housing and is extended to the static portion to be engaged with the static portion.

16. The device of claim 15 wherein the static portion includes a housing having disposed on an inner surface thereof a plurality of linearly disposed tabs with which the cam is engageable when in the secured position.

17. The device of claim 16 wherein the static portion includes a pair of oppositely disposed sets of the plurality of tabs.

18. The device of claim 17 wherein the tabs are unitarily formed with the housing.

19. The device of claim 17 wherein the static portion includes a pair of oppositely disposed rack plates each having one of the sets of the plurality of tabs;

the cam including a pair of oppositely disposed arms for respectively engaging with a pair of the tabs when the actuatable portion is in the secured position.

20. The device of claim 19 wherein the static portion includes a pair of oppositely disposed walls, and the rack plates are respectively disposed on the walls in a substantially planar abutting relationship.

\* \* \* \* \*